(12) United States Patent
Poot

(10) Patent No.: US 8,176,442 B2
(45) Date of Patent: May 8, 2012

(54) LIVING CURSOR CONTROL MECHANICS

(75) Inventor: Rudy Jacobus Poot, Clyde Hill, WA (US)

(73) Assignee: Microsoft Corporation, Redmond, WA (US)

(*) Notice: Subject to any disclaimer, the term of this patent is extended or adjusted under 35 U.S.C. 154(b) by 397 days.

(21) Appl. No.: 12/474,347

(22) Filed: May 29, 2009

(65) Prior Publication Data

US 2010/0306710 A1 Dec. 2, 2010

(51) Int. Cl.
 *G06F 3/048* (2006.01)
 *G06F 3/01* (2006.01)
(52) U.S. Cl. .................. 715/856; 715/863; 345/158
(58) Field of Classification Search .......... 715/764, 715/765, 856, 861, 862, 863, 866; 345/156, 345/157, 158
 See application file for complete search history.

(56) References Cited

U.S. PATENT DOCUMENTS

| | | | |
|---|---|---|---|
| 5,252,951 A * | 10/1993 | Tannenbaum et al. ........ 345/156 |
| 6,057,909 A | 5/2000 | Yahav et al. |
| 6,100,517 A | 8/2000 | Yahav et al. |
| 6,256,033 B1 | 7/2001 | Nguyen |
| 6,498,628 B2 | 12/2002 | Iwamura |
| 6,502,515 B2 | 1/2003 | Burckhardt et al. |
| 6,512,838 B1 | 1/2003 | Rafii et al. |
| 6,539,931 B2 | 4/2003 | Trajkovic et al. |
| 6,674,877 B1 | 1/2004 | Jojic et al. |
| 6,771,277 B2 | 8/2004 | Ohba |
| 6,950,534 B2 | 9/2005 | Cohen et al. |
| 7,006,236 B2 | 2/2006 | Tomasi et al. |
| 7,050,177 B2 | 5/2006 | Tomasi et al. |
| 7,151,530 B2 | 12/2006 | Roeber et al. |
| 7,224,384 B1 | 5/2007 | Iddan et al. |
| 7,227,526 B2 | 6/2007 | Hildreth et al. |
| 7,293,356 B2 | 11/2007 | Sohn et al. |
| 7,308,112 B2 | 12/2007 | Fujimura et al. |
| 7,310,431 B2 | 12/2007 | Gokturk et al. |
| 7,317,836 B2 | 1/2008 | Fujimura et al. |
| 7,340,077 B2 | 3/2008 | Gokturk et al. |
| 7,367,887 B2 | 5/2008 | Watabe et al. |

(Continued)

FOREIGN PATENT DOCUMENTS

WO WO 99/15863 A1 4/1999

(Continued)

OTHER PUBLICATIONS

Qian et al., "A Gesture-Driven Multimodal Interactive Dance System", IEEE International Conference on Multimedia and Expo, Taipei, Jun. 2004, 3, 1579-1582.

(Continued)

*Primary Examiner* — Xiomar L Bautista
(74) *Attorney, Agent, or Firm* — Woodcock Washburn LLP

(57) ABSTRACT

Disclosed herein are systems and methods for controlling a cursor. A user may control a cursor displayed by a computing environment such as a game console, a computer, or the like by performing one or more gestures. An activity of a cursor on an audiovisual display may be controlled based on one or more gestures of the user, a profile of the user, other inputs, or combinations thereof. Further, an appearance of a cursor on an audiovisual display may also be controlled based on one or more gestures of the user, a profile of the user, other inputs, or combinations thereof. User gestures may be detected by, for example, a capture device. For example, the capture device may capture a depth image of a scene including a user.

17 Claims, 6 Drawing Sheets

U.S. PATENT DOCUMENTS

| | | | |
|---|---|---|---|
| 7,489,306 B2 | 2/2009 | Kolmykov-Zotov | |
| 7,519,223 B2 | 4/2009 | Dehlin | |
| 7,590,262 B2 | 9/2009 | Fujimura et al. | |
| 2002/0057383 A1* | 5/2002 | Iwamura | 348/734 |
| 2002/0063740 A1* | 5/2002 | Forlenza et al. | 345/856 |
| 2004/0108992 A1* | 6/2004 | Rosenberg | 345/156 |
| 2004/0207597 A1 | 10/2004 | Marks | |
| 2005/0007384 A1* | 1/2005 | Yamada et al. | 345/619 |
| 2005/0059488 A1 | 3/2005 | Larsen et al. | |
| 2006/0033701 A1 | 2/2006 | Wilson | |
| 2006/0188144 A1 | 8/2006 | Sasaki et al. | |
| 2006/0239558 A1 | 10/2006 | Rafii et al. | |
| 2007/0013718 A1 | 1/2007 | Ohba | |
| 2007/0060336 A1 | 3/2007 | Marks et al. | |
| 2007/0094335 A1* | 4/2007 | Tu | 709/206 |
| 2007/0098222 A1 | 5/2007 | Porter et al. | |
| 2007/0125633 A1 | 6/2007 | Boillot | |
| 2007/0216894 A1 | 9/2007 | Garcia et al. | |
| 2007/0260984 A1 | 11/2007 | Marks et al. | |
| 2007/0279485 A1 | 12/2007 | Ohba et al. | |
| 2007/0283296 A1 | 12/2007 | Nilsson | |
| 2007/0298882 A1 | 12/2007 | Marks et al. | |
| 2008/0001951 A1 | 1/2008 | Marks et al. | |
| 2008/0019591 A1* | 1/2008 | Iwayama et al. | 382/187 |
| 2008/0062257 A1 | 3/2008 | Corson | |
| 2008/0084385 A1 | 4/2008 | Ranta | |
| 2008/0100620 A1 | 5/2008 | Nagai et al. | |
| 2008/0126937 A1 | 5/2008 | Pachet | |
| 2008/0129694 A1 | 6/2008 | Haven | |
| 2008/0134102 A1 | 6/2008 | Movold et al. | |
| 2008/0152191 A1 | 6/2008 | Fujimura et al. | |
| 2008/0215972 A1 | 9/2008 | Zalewski et al. | |
| 2008/0215973 A1 | 9/2008 | Zalewski et al. | |
| 2009/0073117 A1* | 3/2009 | Tsurumi et al. | 345/158 |
| 2009/0100373 A1* | 4/2009 | Pixley et al. | 715/786 |
| 2009/0141933 A1 | 6/2009 | Wagg | |
| 2009/0167679 A1 | 7/2009 | Klier et al. | |
| 2009/0221368 A1 | 9/2009 | Yen et al. | |
| 2010/0125816 A1* | 5/2010 | Bezos | 715/863 |
| 2011/0007035 A1* | 1/2011 | Shai | 345/179 |

FOREIGN PATENT DOCUMENTS

| | | |
|---|---|---|
| WO | WO 01/59975 A3 | 1/2002 |
| WO | WO 02/082249 A2 | 10/2002 |
| WO | WO 03/001722 A3 | 3/2003 |
| WO | WO 03/046706 A1 | 6/2003 |
| WO | WO 03/073359 A3 | 11/2003 |
| WO | WO 03/054683 A3 | 12/2003 |
| WO | WO 03/071410 A3 | 3/2004 |
| WO | WO 2009/059065 A1 | 5/2009 |

OTHER PUBLICATIONS

Shivappa et al., "Person Tracking with Audio-Visual Cues Using Iterative Decoding Framework", IEEE Fifth International Conference on Advanced Video and Signal Based Surveillance, AVSS '08, Santa Fe, NM, Sep. 1-3, 2008, 260-267.

Fried, I., "Microsoft puts Finger on Better Gestures", Beyond Binary-CNET News, Apr. 6, 2009, http://news.cnet.com, 3 pages.

Geer, D., "Will gesture-Recognition Technology Point the Way?", Computer, Oct. 2004, 20-23, http://www.canesta.com.

von Hardenberg, C. et al., "Bare-Hand Human-Computer Interaction", Proceedings of the ACM Workshop on Perceptive User Interfaces, Nov. 15-16, 2001, 8 pages.

Tu, J. et al., "Face as Mouse through Visual Face Tracking", Proceedings of the Second Canadian Conference on Computer and Robot Vision, 2005, 8 pages.

Innovative Multi-Touch Solutions by Natural User Interface, Downloaded from Internet Mar. 30, 2009, http://natural-ui.com/solutions/products.html, 2 pages.

* cited by examiner

LIVING CURSOR CONTROL MECHANICS

BACKGROUND

In a typical computing environment or gaming system, a user has a controller that he or she may use to interact with the system. Controllers known in the art include keyboards, mice, joysticks, and the like. Controllers are often used for controlling a cursor on an audiovisual display. If control of the cursor were to be shifted from a connected controller to gesture based control, it may be difficult for some users to precisely control placement and movement of the cursor by use of gesture commands. For example, a user may have some difficulty in making a hand movement for controlling a cursor to select an object displayed on an audiovisual display.

Accordingly, systems and methods are needed for providing enhanced cursor control to users using gesture commands to control the cursor.

SUMMARY

Disclosed herein are systems, methods, and computer readable media for controlling a cursor. A user may control a cursor displayed by a computing environment such as a game console, a computer, or the like by performing one or more gestures. An activity of a cursor on an audiovisual display may be controlled based on one or more gestures of the user, a profile of the user, other inputs, or combinations thereof. Further, an appearance of a cursor on an audiovisual display may also be controlled based on one or more gestures of the user, a profile of the user, other inputs, or combinations thereof. User gestures may be detected by, for example, a capture device. For example, the capture device may capture a depth image of a scene including a user.

According to an embodiment, user movements may be tracked over a period of time for determining whether movements by the user were intended as input gestures for controlling the cursor. For example, movement of a user's hand may be analyzed using gesture models for determining whether the user intended to move his or her hand for controlling a cursor. Based on the analysis, the computing environment may determine that one or more aspects of the movement are a sufficiently similar to one or more aspects of a defined gesture such that it may be determined that the hand movement for controlling the cursor is detected.

In another embodiment, a change in the distance of the user's hand or other appendage with respect to a capture device may be determined. In response to the determination, an appearance and/or activity of the cursor may be changed. For example, the cursor may be made to appear to move in a z-direction on a display screen in response to detecting that the distance of the user's hand with respect to the capture device is changing. If the user's hand moves closer to the capture device, the cursor may appear smaller, such that the cursor appears to be moving further from the user. In contrast, if the user's hand moves further from the capture device, the cursor may appear larger, such that the cursor appears to be moving closer the user. Thus, the cursor can be made to appear that it physically reacts to the movement of the user's hand.

In yet another embodiment, a cursor may have a magnetic attraction to other selectable display objects. For example, virtual representations of icons, buttons, or other important areas may become "magnetic" to a cursor such that the cursor "snaps" when in close proximity to the icons, buttons, or other important areas. As used herein, a cursor on an audiovisual display may "snap" to important icons, or may have a greater tendency to move towards important screen locations based on user gestures. In an example embodiment, if, for example, a user's profile indicates that they typically operate with large gestures only, the target recognition, analysis and tracking system may adapt with expectations that fine or precise gestures may be ignored. In an example, the cursor may automatically move rapidly onto another display object when the cursor is within a predetermined distance of the display object, such that the cursor appears to be magnetically attached to the display object. According to another embodiment, if a user profile or size indicates that a user is very young, and thus more likely to move in an erratic fashion, the target recognition, analysis and tracking system may adapt its response to movements to smooth or aid the motions of the user.

In another embodiment, a cursor may be controlled by artificial intelligence such that the cursor's appearance and/or activity is changed based on a user's detected motion, mood, effort, the like, and combinations thereof. A history of these attributes of the user may be stored, and the cursor's behavior changed in accordance with the user's attributes.

In yet another embodiment, a cursor may be controlled to emulate real world physics. As a result, the cursor may appear and/or act very organic by utilizing attributes such as bounce, spring, fluidity, elasticity, and the like.

BRIEF DESCRIPTION OF THE DRAWINGS

The systems, methods, and computer readable media for controlling a cursor in accordance with this specification are further described with reference to the accompanying drawings in which.

DETAILED DESCRIPTION OF ILLUSTRATIVE EMBODIMENTS

Figure 1A:
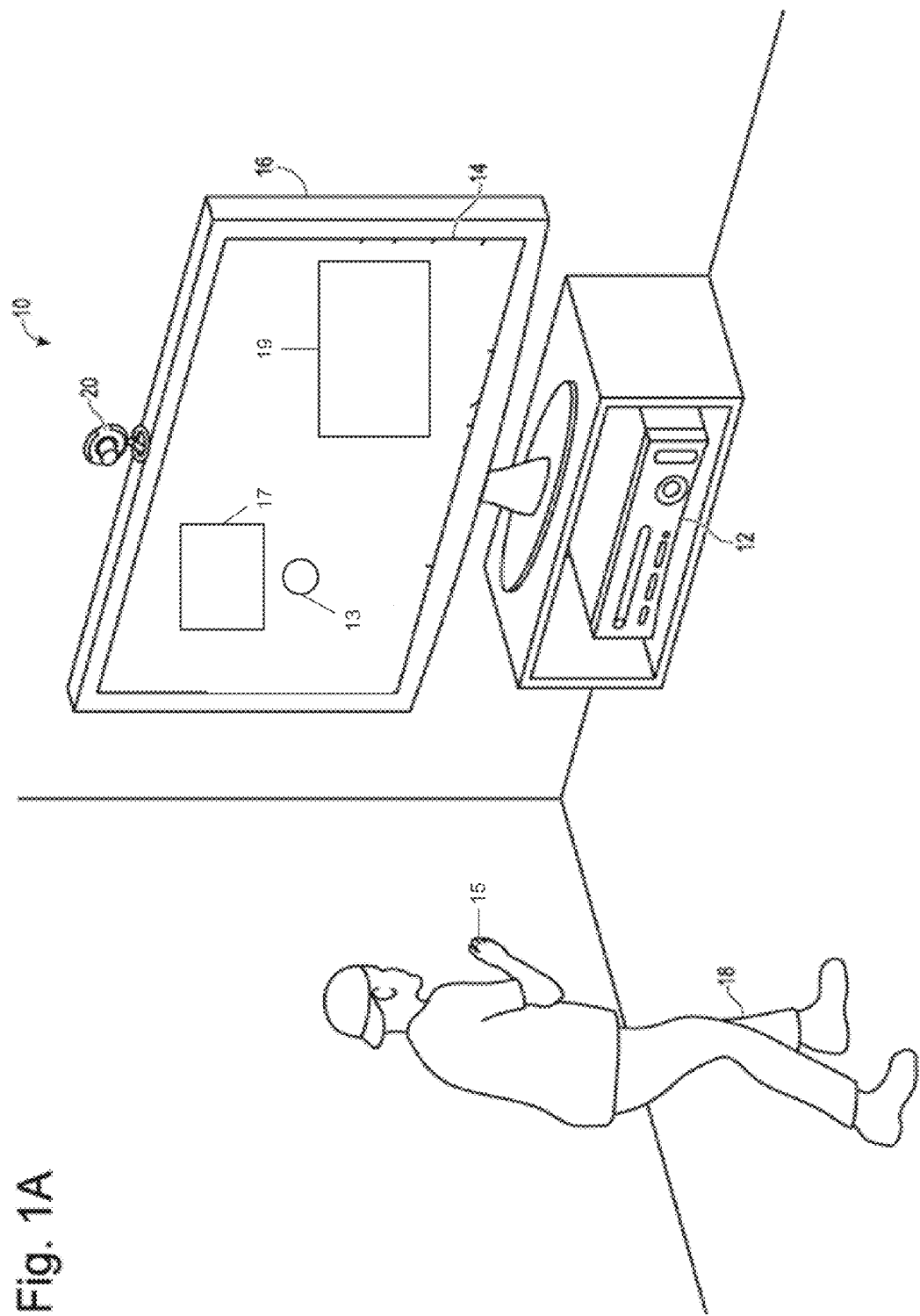
FIGS. 1A and 1B illustrate an example embodiment of a configuration of a target recognition, analysis, and tracking system with a user using a cursor to interact with an application.

As will be described herein, a user may control a cursor displayed by a computing environment such as a game console, a computer, or the like by performing one or more gestures. According to one embodiment, an activity of a cursor on an audiovisual display may be controlled based on one or more gestures of the user, a profile of the user, other inputs, or combinations thereof. Further, an appearance of a cursor on an audiovisual display may also be controlled based on one or more gestures of the user, a profile of the user, other inputs, or combinations thereof.

In an exemplary embodiment, user gestures may be detected by, for example, a capture device. For example, the capture device may capture a depth image of a scene including a user. In one embodiment, the capture device may determine whether one or more targets or objects in the scene correspond to a human target such as the user. If the capture device determines that one or more objects in the scene is a human, it may determine the depth to the human as well as the size of the human. The device may then center a virtual screen around each human target based on stored information, such as, for example a look up table that matches size of the person to wingspan and/or personal profile information. Each target or object that matches the human pattern may be scanned to generate a model such as a skeletal model, a mesh human model, or the like associated therewith. The model may then be provided to the computing environment such that the computing environment may track the model, determine which movements of the model are inputs for controlling an activity of a cursor, and render the cursor's activity based on the control inputs.

User movements may be tracked over a period of time for determining whether movements by the user were intended as input gestures for controlling the cursor. For example, movement of a user's hand may be analyzed using gesture models for determining whether the user intended to move his or her hand for controlling a cursor. Based on the analysis, the computing environment may determine that one or more aspects of the movement are a sufficiently similar to one or more aspects of a defined gesture such that it may be determined that the hand movement for controlling the cursor is detected. Exemplary hand movements include waving of one or both hands, clasping hands together, or a series of hand movements that signify a recognized pattern for initiating cursor control.

In an exemplary embodiment, a profile of a person may be determined by, for example, receiving information from a person regarding his or her profile. The user can enter the profile information via an input device such as, for example, a keyboard, a mouse, a joystick, and the like. Alternatively, a capture device can detect an image of the user and obtain profile information based on the image. Other sensor devices, such as a microphone, may detect user data and extract user profile information based on the detected data. Exemplary user profile information includes a person's size, facial features, voice, age, and the like.

In another embodiment, a profile of a person may include the person's playing history, gesture input history, typical mode of play, and the like. This profile data may be determined based on the user's previous play inputs, gestures, and style of play.

Figure 1B:
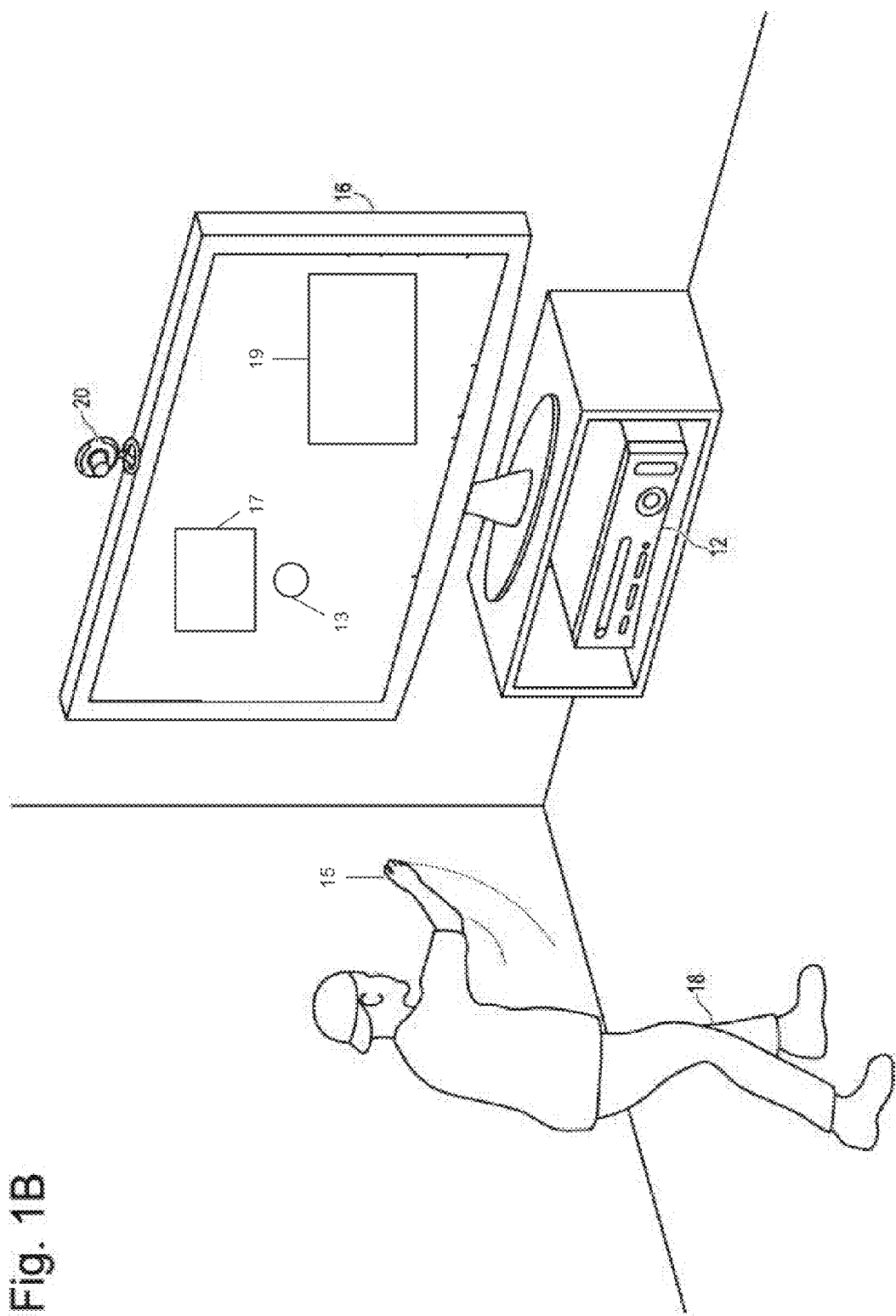

FIGS. 1A and 1B illustrate an example embodiment of a configuration of a target recognition, analysis, and tracking system 10 with a user 18 using a cursor 13 to interact with an application. In the example embodiment, the system 10 may recognize, analyze, and track movements of the user's hand 15 or other appendage of the user 18. Further, the system 10 may analyze the movement of hand 15, and determine an appearance and/or activity for the cursor 13 within a display 14 of an audiovisual device 16 based on the hand movement or other appendage of the user, as described in more detail herein. The cursor's appearance and/or activity may also be based on the user's profile information, as described in more detail herein. In this example, the cursor 13 is spherically-shaped but may be any other suitable shape.

As shown in FIG. 1A, the system 10 may include a computing environment 12. The computing environment 12 may be a computer, a gaming system, console, or the like. According to an example embodiment, the computing environment 12 may include hardware components and/or software components such that the computing environment 12 may be used to execute applications such as gaming applications, non-gaming applications, and the like.

As shown in FIG. 1, the system 10 may include a capture device 20. The capture device 20 may be, for example, a detector that may be used to monitor one or more users, such as the user 18, such that movements performed by the one or more users may be captured, analyzed, and tracked for determining an intended gesture, such as a hand movement for controlling the cursor 13 within an application, as will be described in more detail below.

According to one embodiment, the system 10 may be connected to the audiovisual device 16. The audiovisual device 16 may be any type of display system, such as a television, a monitor, a high-definition television (HDTV), or the like that may provide game or application visuals and/or audio to a user such as the user 18. For example, the computing environment 12 may include a video adapter such as a graphics card and/or an audio adapter such as a sound card that may provide audiovisual signals associated with the game application, non-game application, or the like. The audiovisual device 16 may receive the audiovisual signals from the computing environment 12 and may then output the game or application visuals and/or audio associated with the audiovisual signals to the user 18. According to one embodiment, the audiovisual device 16 may be connected to the computing environment 12 via, for example, an S-Video cable, a coaxial cable, an HDMI cable, a DVI cable, a VGA cable, or the like.

As shown in FIGS. 1A and 1B, in an example embodiment, two applications may be executing on the computing environment 12. The two applications may be represented within two windows 15 and 17 displayed on the audiovisual device 16. The user 18 may use gestures to control movement of the cursor 13 within the displayed windows environment and to control interaction of the cursor 13 with the windows 15 and 17 for interfacing with the respective applications. For example, the user 18 may move his hand 15 in an upwards direction as shown in FIG. 1B for moving the cursor 13 in an upwards direction. Similarly, the user 18 may move his hand 15 downwards, left, or right for moving the cursor 13 in corresponding directions. Thus, according to an example embodiment, the computing environment 12 and the capture device 20 of the system 10 may be used to recognize and analyze a gesture of the user 18 in physical space such that the gesture may be interpreted as a control input of the cursor 13 in the display space.

According to other embodiment, the system 10 may further be used to interpret target movements as operating system and/or game controls. For example, virtually any controllable aspect of an operating system and/or game may be controlled by movements of the target such as the user 18.

In addition, a profile of the user 18, in combination or apart from the user's gestures, may be used for controlling the appearance and/or activity of the cursor 13. For example, the user's profile may include one or more of the user's game playing history, previous cursor operation history, gesture input history, typical mode of game play, and the like. This profile data may be determined based on the user's previous play inputs, gestures, and style of play. Further, the user's profile may include one or more of the user's size, facial features, voice, playing history, age, and the like.

One or both of the user's gestures and profile can change or otherwise control an appearance of the cursor 13. For example, the user's gestures and/or profile can control the one or more of the cursor's color, shape, size, graphics, and the like.

System 10 may include a microphone or other suitable device to receive audio input for use in determining an appearance and/or activity of the cursor. For example, a color and/or graphics of the cursor 13 may change based on the audio input. In an example, a user's voice input can change the appearance of the cursor based on, for example, frequency tonal range, other audio analysis systems, or the like. The cursor may also animate, change shape, shift color, and the like based on backgrounds sounds, or sound directly from a host system. In an example, music can be sent through the system, and the cursor may move or "dance" along with the music as the cursor is used.

Figure 2:
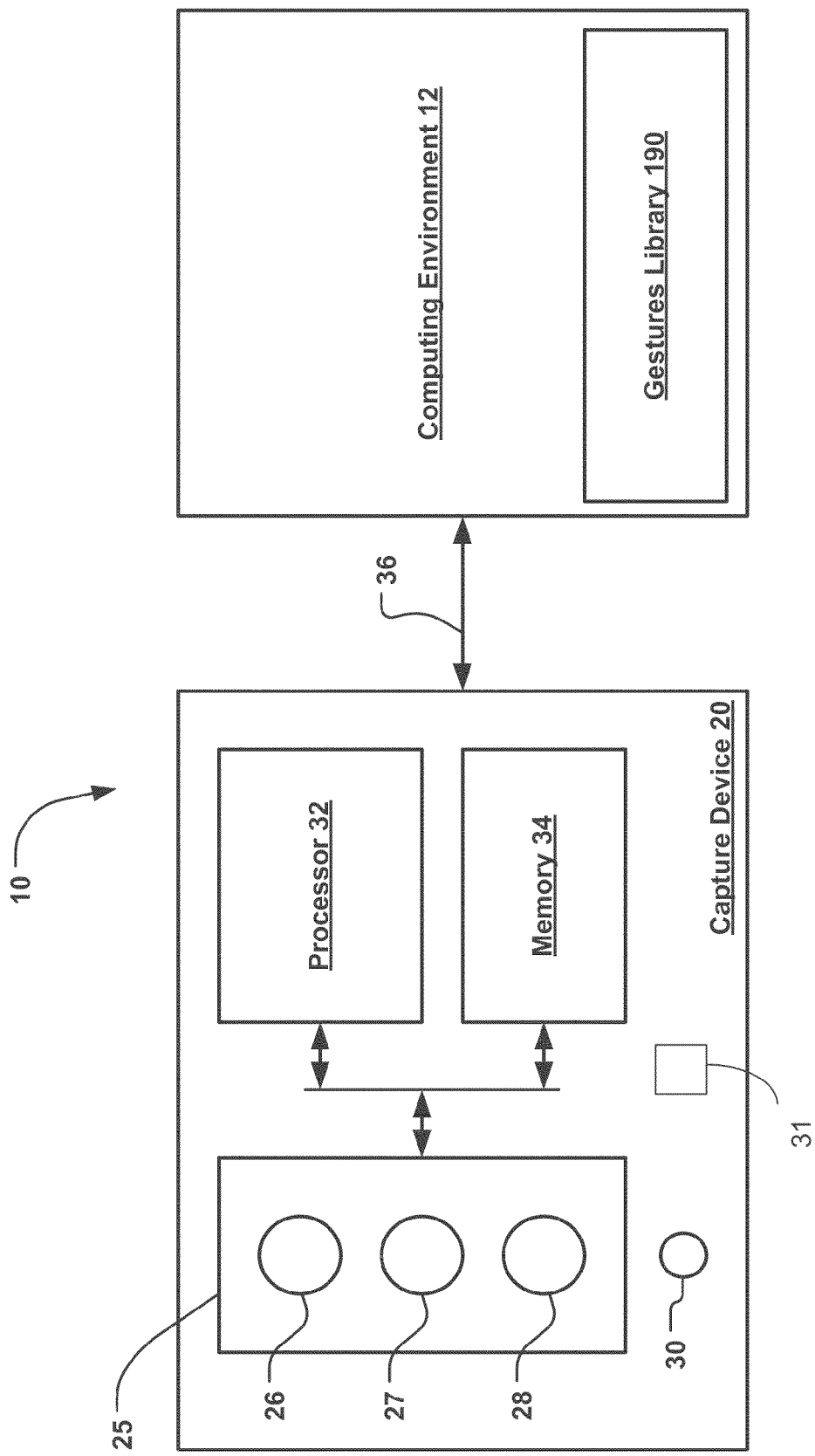
FIG. 2 illustrates an example embodiment of a capture device.

FIG. 2 illustrates an example embodiment of the capture device 20 that may be used in the system 10. According to the example embodiment, the capture device 20 may be configured to capture video with user movement information including one or more images that may include gesture values via any suitable technique including, for example, time-of-flight, structured light, stereo image, or the like. According to one embodiment, the capture device 20 may organize the calculated gesture information into coordinate information, such as X-, Y-, and Z-coordinate information. The coordinates of a user model, as described herein, may be monitored over time to determine a movement of the user's hand or the other appendages. Based on the movement of the user model coordinates, the computing environment may determine whether the user is making a defined gesture for controlling an activity and/or appearance of a cursor.

As shown in FIG. 2, according to an example embodiment, the image camera component 25 may include an IR light component 26, a three-dimensional (3-D) camera 27, and an RGB camera 28 that may be used to capture a gesture image(s) of a user. For example, in time-of-flight analysis, the IR light component 26 of the capture device 20 may emit an infrared light onto the scene and may then use sensors (not shown) to detect the backscattered light from the surface of user's hand or other appendage using, for example, the 3-D camera 27 and/or the RGB camera 28. In some embodiments, pulsed infrared light may be used such that the time between an outgoing light pulse and a corresponding incoming light pulse may be measured and used to determine a physical distance from the capture device 20 to a particular location on the user's hand. Additionally, in other example embodiments, the phase of the outgoing light wave may be compared to the phase of the incoming light wave to determine a phase shift. The phase shift may then be used to determine a physical distance from the capture device to the user's hand. This information may also be used to determine the user's hand movement for controlling the appearance and/or activity of the cursor.

According to another example embodiment, time-of-flight analysis may be used to indirectly determine a physical distance from the capture device 20 to the user's hand by analyzing the intensity of the reflected beam of light over time via various techniques including, for example, shuttered light pulse imaging. This information may also be used to determine movement of the user's hand.

In another example embodiment, the capture device 20 may use a structured light to capture gesture information. In such an analysis, patterned light (i.e., light displayed as a known pattern such as grid pattern or a stripe pattern) may be projected onto the scene via, for example, the IR light component 26. Upon striking the surface of the user's hand, the pattern may become deformed in response. Such a deformation of the pattern may be captured by, for example, the 3-D camera 27 and/or the RGB camera 28 and may then be analyzed to determine a physical distance from the capture device to the user's hand.

According to another embodiment, the capture device 20 may include two or more physically separated cameras that may view a scene from different angles, to obtain visual stereo data that may be resolved to generate gesture information.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the system 10. Additionally, the microphone 30 may be used to receive audio signals that may also be provided by the user to control the activity and/or appearance of a cursor.

In an example embodiment, the capture device 20 may further include a processor 32 that may be in operative communication with the image camera component 25. The processor 32 may include a standardized processor, a specialized processor, a microprocessor, or the like that may execute instructions that may include instructions for receiving the user gesture-related images, determining whether a user's hand may be included in the gesture image(s), converting the image into a skeletal representation or model of the user's hand, or any other suitable instruction.

The capture device 20 may further include a memory component 34 that may store the instructions that may be executed by the processor 32, images or frames of images captured by the 3-D camera or RGB camera, player profiles or any other suitable information, images, or the like. According to an example embodiment, the memory component 34 may include random access memory (RAM), read only memory (ROM), cache, flash memory, a hard disk, or any other suitable storage component. As shown in FIG. 2, in one embodiment, the memory component 34 may be a separate component in communication with the image capture component 25 and the processor 32. According to another embodiment, the memory component 34 may be integrated into the processor 32 and/or the image capture component 25.

As shown in FIG. 2, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the user gesture information and images captured by, for example, the 3-D camera 27 and/or the RGB camera 28, and a skeletal model that may be generated by the capture device 20 to the computing environment 12 via the communication link 36. The computing environment 12 may then use the skeletal model, gesture information, and captured images to, for example, control an cursor appearance and/or activity. For example, as shown, in FIG. 2, the computing environment 12 may include a gestures library 190 for storing gesture data. The gesture data may include a collection of gesture filters, each comprising information concerning a gesture that may be performed by the skeletal model (as the user's hand moves). The data captured by the cameras 27, 28 and device 20 in the form of the skeletal model and movements associated with it may be compared to the gesture filters in the gesture library 190 to identify when a user's hand (as represented by the skeletal model) has performed one or more gestures. Those gestures may be associated with various inputs for controlling an appearance and/or activity of the cursor. Thus, the computing environment 12 may use the gestures library 190 to interpret movements of the skeletal model and to change the cursor's appearance and/or activity.

Figure 3:
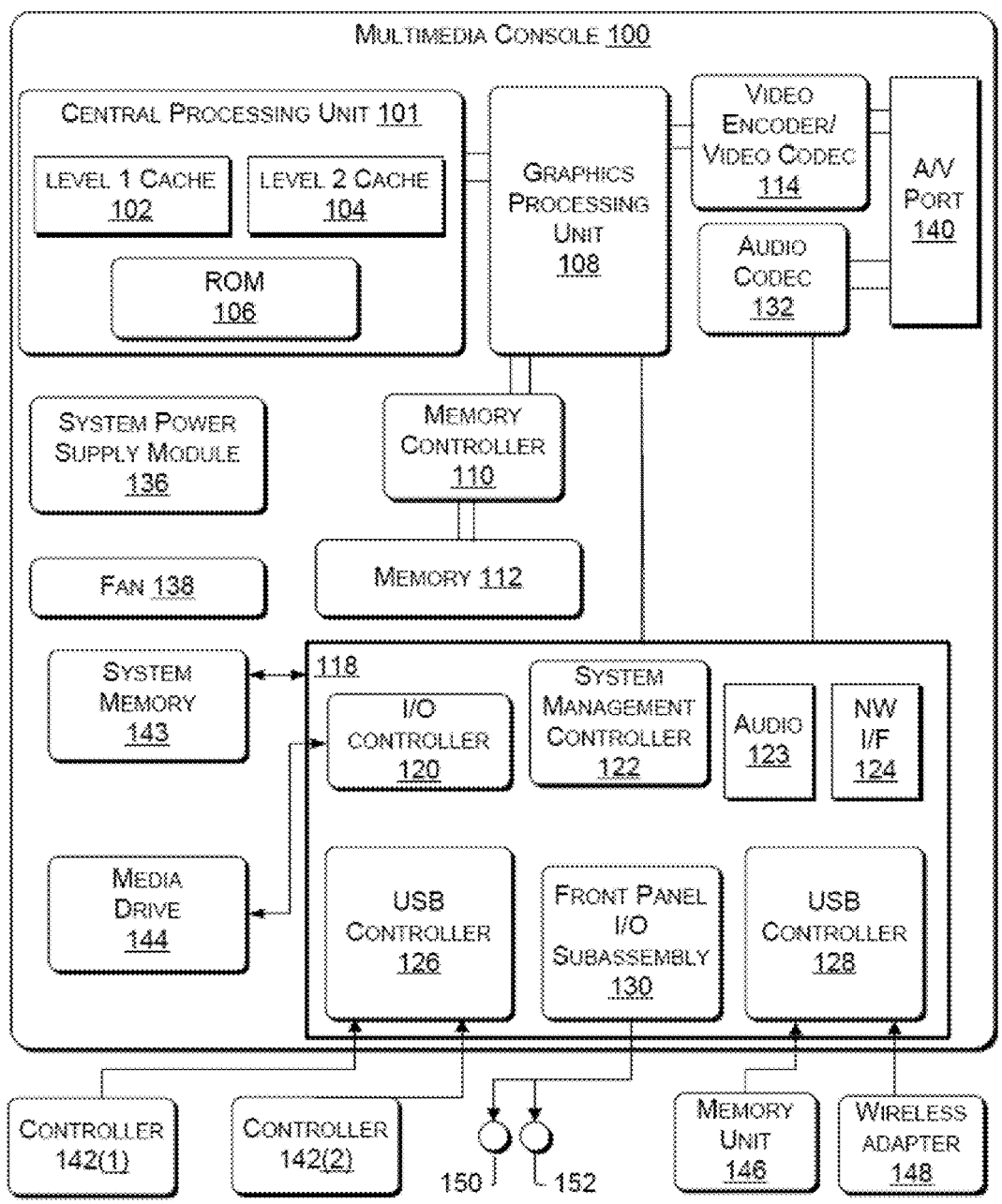
FIG. 3 illustrates an example embodiment of a computing environment that may be used to control an appearance and activity of a cursor based on a profile and one or more gestures of a person in a target recognition, analysis, and tracking system.

FIG. 3 illustrates an example embodiment of a computing environment that may be used to control an appearance and activity of a cursor based on a profile and one or more gestures of a person in a target recognition, analysis, and tracking system. The computing environment such as the computing environment 12 described above with respect to FIGS. 1A-2 may be a multimedia console 100, such as a gaming console. As shown in FIG. 3, the multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 27, 28 and capture device 20 may define additional input devices for the console 100.

Figure 4:
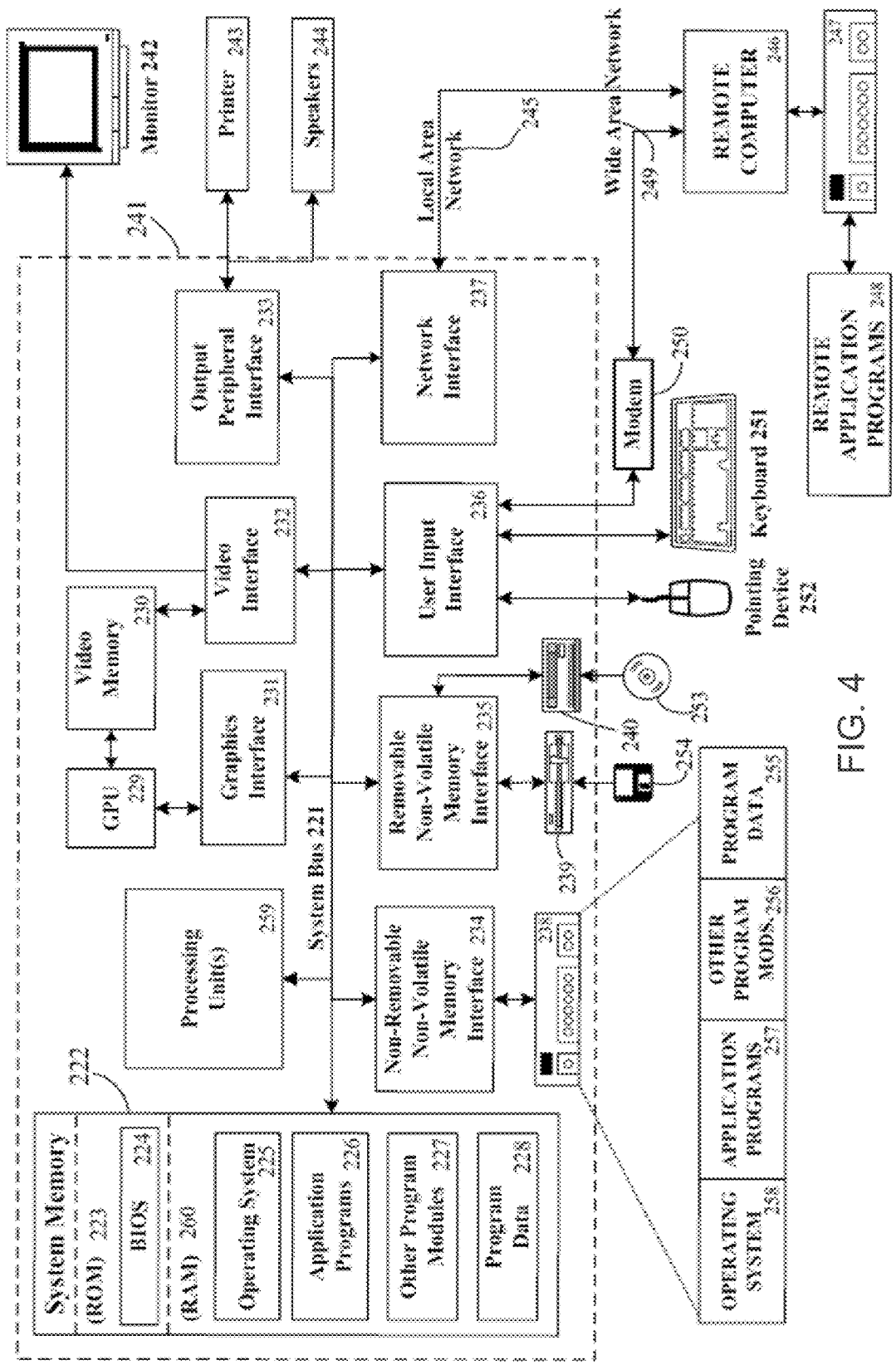
FIG. 4 illustrates another example embodiment of a computing environment that may be the computing environment shown in FIGS. 1A-2 for controlling an appearance and activity of a cursor based on a profile and one or more gestures of a person in a target recognition, analysis, and tracking system.

FIG. 4 illustrates another example embodiment of a computing environment 220 that may be the computing environment 12 shown in FIGS. 1A-2 used to control an appearance and activity of a cursor based on a profile and one or more gestures of a person in a target recognition, analysis, and tracking system. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 4, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 27, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4. The logical connections depicted in FIG. 2 include a local area network (LAN)

245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 illustrates remote application programs 248 as residing on memory device 247. It will be appreciated that the network connections shown are exemplary and other means of establishing a communications link between the computers may be used.

Figure 5:
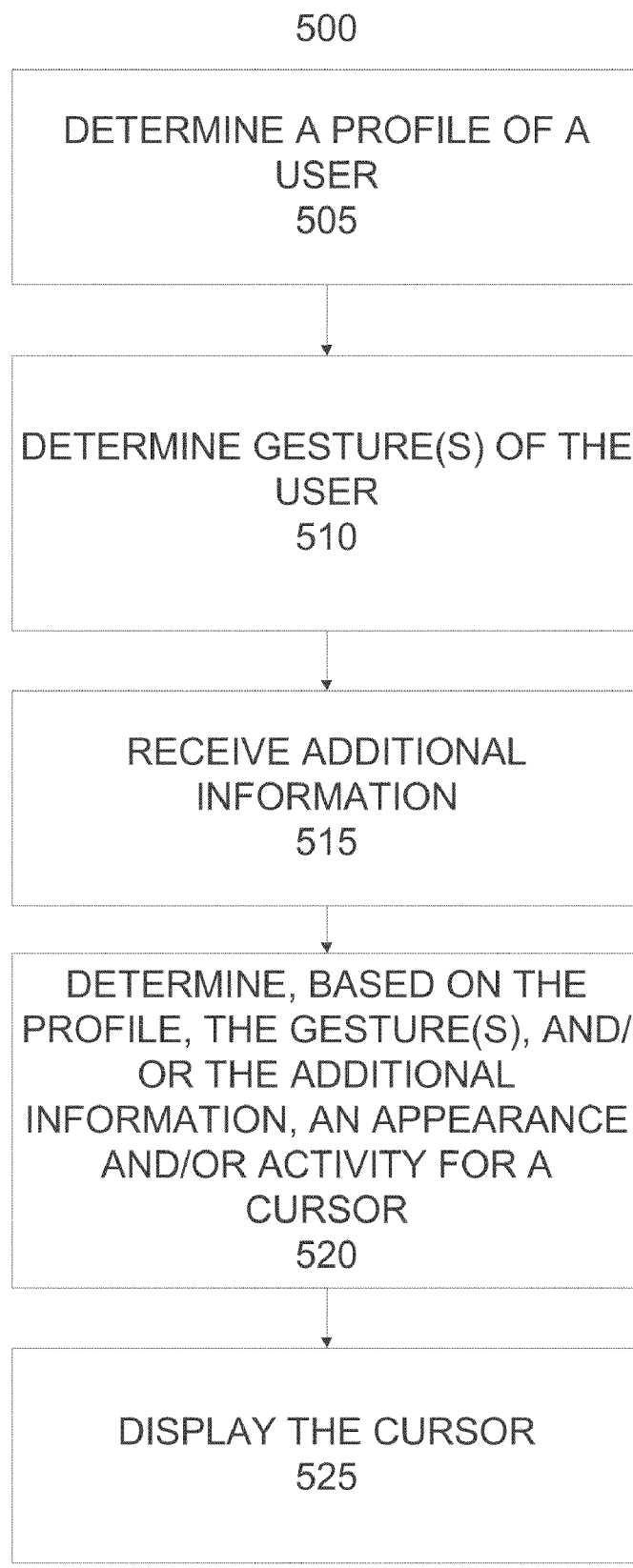
FIG. 5 depicts a flow diagram of an example method for controlling a cursor.

FIG. 5 depicts a flow diagram of an example method 500 for controlling a cursor. The example method may control a cursor displayed by a computing environment, computer, or the like on an audiovisual display. In an example embodiment, the activity and appearance of a cursor on an audiovisual display may be controlled based on a profile of a user, one or more user gestures, other inputs, or combinations thereof. The example method 500 may be implemented using, for example, the capture device 20 and/or the computing environment 12, which may be contained in the target analysis, recognition and tracking system 10 described with respect to FIGS. 1A-4. The cursor and changes to the cursor's activity and/or appearance based on the user's profile and/or gestures may be displayed on any suitable type of display, such as audiovisual display 16.

At 505 of the exemplary method, a profile of a user is determined. According to one embodiment, a user profile may be stored information about the user's size, face, voice, or any combination thereof. The profile information may be compared to visual data captured by image capture component 25 for recognizing a user and for associating the cursor with the user.

At 510 of the exemplary method, one or more gestures of the user are determined. In an embodiment, gestures may be received by, for example, capture device 20. For example, the capture device may capture one or more images of a scene over a period of time. In one embodiment, the capture device may determine whether one or more targets or objects in the captured image(s) corresponds to a human target such as the user. If the capture device determines that one or more objects in the captured images(s) is a human, it may determine a particular gesture of the person, such as a particular arm movement. Gesture data corresponding to different inputs for controlling the cursor may be stored by computing environment 12 of the system 10. For example, the computing environment 12 may store gesture modeling data that may be used to compare against a user's gestures. The gesture data may include a collection of gesture filters, each comprising information concerning a gesture that may be performed by the user's skeletal model (as the user moves). The gesture data may contain certain aspects used for comparison to aspects of a user's movement to determine whether the user is making a particular gesture intended as a control input for the cursor.

At step 515, the system 10 may receive additional information for use in controlling the cursor. For example, the system 10 may include a microphone or other suitable sensor device to receive audio input for use in determining an appearance and/or activity of the cursor.

At step 520, the system 10 may determine one or both of the appearance and activity for the cursor based on the profile determined at step 505, one or more gestures determined at step 510, and additional information received at step 515. In an example, one or more of the cursor's color, shape, size, and graphics may be changed in response to the user's profile, one or more of the user's gestures, and additional information received at step 515. Subsequently, at step 525, the cursor's appearance and/or activity displayed by the audiovisual display 16 may change in accordance with the determination at step 520.

In an example embodiment, a hand movement of a user may be detected by the system 10 and used for causing a physics-based reaction of the cursor 13. A vector of the movement of a user's hand may be tracked over time and the data stored in memory. The cursor may move in accordance with the vector. For example, if the hand moves upwards, the cursor moves along a similar upwards vector. If the hand moves diagonally, the cursor moves along a similar diagonal vector. Alternatively, rather than moving the cursor based on a user's hand movement, movement of another appendage of the user, such as the user's finger, may be detected and used for causing a physics-based reaction of the cursor.

Further, if a cursor's moves in a predetermined vector with respect to a display object, a physics-based reaction may be caused. For example, the cursor 13 shown in FIG. 1B is moved upward by movement of the user's hand 15 upward. An edge of the cursor 13 may move in such a direction that its edge "contacts" the edge of another display object. In this instance, the cursor 13 may "bounce" off the other object similar to how objects would react to one another in a physical environment. The movement and speed of the cursor 13 with respect to the other display object may affect the reaction of the cursor. For example, a fast moving cursor may have a greater "bounce" or rebound than a slow moving cursor. In addition, the angle at which the cursor approaches and contacts the other display object may affect the cursor's bounce. For example, the greater the cursor's angle of approach to the surface of the other display object, the greater the rebound angle of the cursor. Exemplary display objects include windows, boundaries defining an edge of a display screen, and the like.

In another example embodiment, the system may detect changing distance of the user's hand with respect to a capture device and change an appearance and/or activity of the cursor in response to the changing distance. For example, the cursor may be made to appear to move in a z-direction on a display screen in response to detecting that the distance of the user's hand with respect to the capture device is changing. If the user's hand moves closer to the capture device, the cursor may appear smaller, such that the cursor appears to be moving further from the user. In contrast, if the user's hand moves further from the capture device, the cursor may appear larger, such that the cursor appears to be moving closer the user. Thus, the cursor can be made to appear that it physically reacts to the movement of the user's hand.

In an example embodiment, a cursor may have a magnetic attraction to other selectable display objects. For example, virtual representations of icons, buttons, or other important areas may become "magnetic" to a cursor such that the cursor "snaps" when in close proximity to the icons, buttons, or other important areas. As used herein, magnetic means that, for example, a cursor on an audiovisual display, such as the audiovisual display 16, may snap to important icons, or may have a greater tendency to move towards important screen locations based on user gestures. In an example embodiment, if, for example, a user's profile indicates that they typically operate with large gestures only, the target recognition, analysis and tracking system may adapt with expectations that fine or precise gestures may be ignored. In an example, the cursor may automatically move rapidly onto another display object when the cursor is within a predetermined distance of the display object, such that the cursor appears to be magnetically attached to the display object. According to another embodiment, if a user profile or size indicates that a user is very young, and thus more likely to move in an erratic fashion, the target recognition, analysis and tracking system may adapt its response to movements to smooth or aid the motions of the user. Any other suitable adaptation based on distance or user profiles may also be included in computing environment 12 and/or target recognition, analysis and tracking system 10.

In accordance with an embodiment, a cursor may be controlled by artificial intelligence such that the cursor's appearance and/or activity is changed based on a user's detected motion, mood, effort, the like, and combinations thereof. A history of these attributes of the user may be stored, and the cursor's behavior changed in accordance with the user's attributes. In an example, a small child's cursor may be large in size to make the user interface experience easier for the child. In another example, when a user moves away from a capture device or is otherwise positioned far from the capture device, the cursor size may be increased for adapting to the precision needed to navigate using the cursor.

In another embodiment, a cursor may be controlled to emulate real world physics. As a result, the cursor may appear and/or act very organic by utilizing attributes such as bounce, spring, fluidity, elasticity, and the like. In an example, the cursor may be controlled to move against a side of a display screen, and the cursor will "bounce" away from the side. In another example, the user's hand may be tracked, and, if the user's hand moves out of view of the capture device, the cursor may move downward or appear to "fall" to the bottom of the screen until the hand is detected again. Alternatively, if the user's hand is out of view, the cursor may stay in position until the user's hand is detected again and the cursor is again controlled by movement of the hand.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

Additionally, the subject matter of the present disclosure includes combinations and subcombinations of the various processes, systems and configurations, and other features, functions, acts, and/or processes disclosed herein, as well as equivalents thereof.

What is claimed is:

1. A method for controlling a cursor, the method comprising:
   displaying the cursor on a display device;
   detecting that a person's hand corresponding to the cursor has moved closer to a capture device; and
   in response to determining that the person's hand has moved closer to the capture device, displaying the cursor on the display device with an increased size.

2. The method of claim 1, further comprising:
   determining a second movement of the person's hand corresponding to the cursor;
   displaying the cursor moved along a vector based on the person's hand movement,
   determining that the cursor's vector meets a predetermined vector with respect to a virtual object displayed on the display device; and
   determining a physics-based reaction of the movement of the cursor with respect to the display object in response to the cursor's vector meeting the predetermined vector with respect to the display object;
   and displaying the cursor moving corresponding to the physics-based reaction.

3. The method of claim 1, further comprising:
   determining that the person's hand has moved away from the capture device; and
   in response to determining that the person's hand has moved away from the capture device, displaying the cursor on the display device with a decreased size.

4. The method of claim 1, further comprising:
   determining that the person's hand has moved such that the cursor has moved to within a predetermined distance from a display object; and
   moving the cursor independent of an additional movement of the person's hand toward the display object selecting the display object with the cursor in response to determining that the cursor is within the predetermined distance from the display object.

5. The method of claim 1, further comprising:
   receiving an audio input; and
   modifying the appearance of the cursor in response to the audio input; and
   displaying the modified cursor on the display device.

6. A computer readable medium having stored thereon computer-executable instructions for controlling a cursor that, when executed on a computer, cause the computer to perform operations comprising:
   determining a profile of a person;
   determining, based on the profile, an appearance for a cursor; and
   displaying the cursor according to the appearance for the cursor.

7. The computer readable medium of claim 6, wherein determining a profile of a person further comprises:
   determining one or more of a person's size, facial features, voice, playing history, gesture input history, age, and typical mode of play.

8. The computer readable medium of claim 6, wherein detecting a gesture of the person further comprises:
   detecting movement of an appendage of the person.

9. The computer readable medium of claim 6, wherein detecting a gesture of the person further comprises:
   tracking hand movements of the person, and wherein displaying the cursor comprises moving the cursor along a vector based on the hand movement of the person;
   further storing thereon computer executable instructions that, when executed on the computer, cause the computer to perform operations comprising:
   determining that the cursor's vector meets a predetermined vector with respect to a display object; and
   causing a physics-based reaction of the cursor with respect to the display object in response to determining that the cursor's vector meets the predetermined vector with respect to the display object.

10. The computer readable medium of claim 6, wherein detecting a gesture of the person further comprises:
    determining that one of the person's hands has moved closer to or away from a capture device; and in response to determining that one of the person's hands moving closer or away from to the capture device, displaying the cursor to appear to be moving in a Z-direction.

11. The computer readable medium of claim 6, further comprising instructions that, when executed on the computer, cause the computer to perform operations comprising:
   in response to determining that a body part of the user used to control the cursor has moved outside of a capture area of a capture device, displaying the cursor as falling to the bottom of a display device.

12. A system for controlling a cursor, the system comprising:
   a processor; and
   a memory communicatively coupled to the processor when the system is operational, the memory bearing processor-executable instructions that, when executed on the processor, cause the system to at least:
      determine a profile of a person;
      determine, based on the profile, an appearance for a cursor; and
      display the cursor according to the appearance for the cursor.

13. The system of claim 12, wherein the instructions that, when executed on the processor, cause the system to at least determine a profile of a person further cause the system to at least:
   determine one or more of a person's size, facial features, voice, playing history, gesture input history, age, and typical mode of play.

14. The system of claim 12 wherein the instructions that, when executed on the processor, cause the system to at least detect detecting a gesture of the person further cause the system to at least:
   detect movement of an appendage of the person.

15. The system of claim 12 wherein the instructions that, when executed on the processor, cause the system to at least detect a gesture of the person further cause the system to at least:
   track hand movements of the person;
   wherein the instructions that, when executed on the processor, cause the system to at least display the cursor cause the system to at least:
      move the cursor along a vector based on the hand movement of the person; and
   wherein the memory further bears instructions that, when executed on the processor, cause the system to at least:
      determine that the cursor's vector meets a predetermined vector with respect to a display object;
      cause a physics-based reaction of the cursor with respect to the display object in response to determining that the cursor's vector meets the predetermined vector with respect to the display object.

16. The system of claim 12, wherein detecting a gesture of the person further comprises:
   determining that one of the person's hands has moved closer to or away from a capture device;
   in response to determining that one of the person's hands moving closer or away from to the capture device, displaying the cursor to appear to be moving in a Z-direction.

17. The system of claim 12, wherein determining an appearance for the cursor comprises:
   determining one of the cursor's color, shape, size, and graphics.

* * * * *